(12) United States Patent
Avati

(10) Patent No.: US 11,064,025 B2
(45) Date of Patent: *Jul. 13, 2021

(54) FILE REPLICATION USING FILE CONTENT LOCATION IDENTIFIERS

(71) Applicant: Red Hat, Inc., Raleigh, NC (US)

(72) Inventor: Anand Avati, Mountain View, CA (US)

(73) Assignee: Red Hat, Inc., Raleigh, NC (US)

( * ) Notice: Subject to any disclaimer, the term of this patent is extended or adjusted under 35 U.S.C. 154(b) by 100 days.

This patent is subject to a terminal disclaimer.

(21) Appl. No.: 15/925,171

(22) Filed: Mar. 19, 2018

(65) Prior Publication Data

US 2018/0213035 A1    Jul. 26, 2018

Related U.S. Application Data

(63) Continuation of application No. 14/219,250, filed on Mar. 19, 2014, now Pat. No. 9,986,029.

(51) Int. Cl.
*G06F 16/00* (2019.01)
*H04L 29/08* (2006.01)
(Continued)

(52) U.S. Cl.
CPC ........ *H04L 67/1095* (2013.01); *G06F 16/184* (2019.01); *G06F 16/1844* (2019.01); *G06F 16/1865* (2019.01); *G06F 16/1873* (2019.01); *G06F 16/22* (2019.01); *G06F 16/2228* (2019.01); *G06F 16/2272* (2019.01);
(Continued)

(58) Field of Classification Search
CPC .... G06F 16/178; G06F 16/128; G06F 16/183; G06F 16/162; G06F 16/16; G06F 16/93; G06F 16/10; G06F 16/14; G06F 16/164; G06F 16/27; G06F 16/116; G06F 16/2228; G06F 16/1873; G06F 16/119; G06F 16/166; G06F 16/41; G06F 16/22; G06F 16/184; G06F 16/1844; G06F 16/1865;
(Continued)

(56) References Cited

U.S. PATENT DOCUMENTS 5,511,177 A    4/1996    Kagimasa et al.
5,544,360 A    8/1996    Lewak et al.
(Continued)

OTHER PUBLICATIONS

USPTO, Office Action for U.S. Appl. No. 14/218,250, dated Dec. 4, 2015.
(Continued)

*Primary Examiner* — Srirama Channavajjala
(74) *Attorney, Agent, or Firm* — Lowenstein Sandler LLP

(57) ABSTRACT

Systems and methods for file replication using file content location identifiers. An example method comprises: receiving, by a processing device, an index node number identifying a first index node associated with a file residing on a first file server, the first index node referencing a physical location of contents of the file; identifying a replica of the file residing on a second file server; assigning the index node number of the first index node to a second index node referencing a physical location of contents of the replica of the file on the second file server; performing, by the processing device, a file system operation by accessing the replica of the file referenced by the index node number.

20 Claims, 4 Drawing Sheets

(51) Int. Cl.
  *G06F 16/22*    (2019.01)
  *G06F 16/182*   (2019.01)
  *G06F 16/18*    (2019.01)
  *G06F 16/23*    (2019.01)

(52) U.S. Cl.
  CPC ...... *G06F 16/2322* (2019.01); *G06F 16/2358* (2019.01); *H04L 67/1097* (2013.01); *G06F 2201/835* (2013.01)

(58) Field of Classification Search
  CPC ............. G06F 16/2272; G06F 16/2322; G06F 16/2358
  See application file for complete search history.

(56) References Cited

U.S. PATENT DOCUMENTS

| | | | |
|---|---|---|---|
| 5,627,996 | A | 5/1997 | Bauer |
| 5,689,706 | A | 11/1997 | Rao et al. |
| 5,745,888 | A * | 4/1998 | Bauer ................... G06F 16/166 |
| 5,886,699 | A | 3/1999 | Belfiore et al. |
| 5,951,649 | A | 9/1999 | Dobbins et al. |
| 6,029,168 | A | 2/2000 | Frey |
| 6,061,678 | A | 5/2000 | Klein et al. |
| 6,421,686 | B1 | 7/2002 | Martin, Jr. |
| 6,466,980 | B1 | 10/2002 | Lumelsky et al. |
| 6,473,767 | B1 | 10/2002 | Bailey et al. |
| 6,697,846 | B1 | 2/2004 | Soltis |
| 6,738,790 | B1 | 5/2004 | Klein et al. |
| 6,856,993 | B1 | 2/2005 | Verma et al. |
| 7,080,102 | B2 | 7/2006 | O'Connell et al. |
| 7,107,419 | B1 | 9/2006 | Ghemawat et al. |
| 7,203,731 | B1 | 4/2007 | Coates et al. |
| 7,275,177 | B2 | 9/2007 | Armangau et al. |
| 7,328,319 | B1 | 2/2008 | Bottomley |
| 7,418,439 | B2 | 8/2008 | Wong |
| 7,590,667 | B2 | 9/2009 | Yasuda et al. |
| 7,617,259 | B1 | 11/2009 | Muth et al. |
| 7,739,240 | B2 | 6/2010 | Saito et al. |
| 7,885,923 | B1 | 2/2011 | Tawri et al. |
| 7,890,469 | B1 | 2/2011 | Maionchi et al. |
| 7,890,632 | B2 | 2/2011 | Hazlewood et al. |
| 7,921,268 | B2 | 4/2011 | Jakob |
| 7,941,709 | B1 | 5/2011 | Hong et al. |
| 7,962,458 | B2 | 6/2011 | Holenstein et al. |
| 8,150,805 | B1 | 4/2012 | Tawri et al. |
| 8,180,747 | B2 * | 5/2012 | Marinkovic ........ G06F 16/1827 707/704 |
| 8,190,850 | B1 | 5/2012 | Davenport et al. |
| 8,234,317 | B1 | 7/2012 | Pogde |
| 8,301,597 | B1 | 10/2012 | Zhou et al. |
| 8,321,380 | B1 | 11/2012 | Leverett |
| 8,484,259 | B1 * | 7/2013 | Makkar ................ G06F 16/907 707/827 |
| 8,977,602 | B2 * | 3/2015 | Shoens ................. G06F 16/16 707/698 |
| 8,983,908 | B2 | 3/2015 | Gowda et al. |
| 9,043,567 | B1 * | 5/2015 | Modukuri ............. G06F 16/00 711/162 |
| 9,104,675 | B1 | 8/2015 | Clark et al. |
| 9,110,917 | B2 | 8/2015 | Avati et al. |
| 9,304,815 | B1 | 4/2016 | Hunter |
| 9,986,029 | B2 * | 5/2018 | Avati ................... G06F 16/1844 |
| 2002/0107874 | A1 | 8/2002 | DeLorme et al. |
| 2002/0133491 | A1 | 9/2002 | Sim et al. |
| 2002/0194015 | A1 | 12/2002 | Gordon et al. |
| 2003/0149709 | A1 | 8/2003 | Banks |
| 2003/0159006 | A1 | 8/2003 | Frank et al. |
| 2003/0163568 | A1 | 8/2003 | Kano et al. |
| 2003/0182257 | A1 | 9/2003 | O'Connell et al. |
| 2003/0182328 | A1 | 9/2003 | Paquette et al. |
| 2003/0191745 | A1 * | 10/2003 | Jiang .................... G06F 16/10 |
| 2003/0217119 | A1 | 11/2003 | Raman et al. |
| 2004/0066741 | A1 | 4/2004 | Dinker et al. |
| 2004/0128556 | A1 | 7/2004 | Burnett |
| 2004/0139128 | A1 | 7/2004 | Becker et al. |
| 2004/0205152 | A1 * | 10/2004 | Yasuda ................. G06F 16/184 709/217 |
| 2004/0250029 | A1 | 12/2004 | Ji et al. |
| 2004/0260726 | A1 | 12/2004 | Hrle et al. |
| 2004/0260972 | A1 | 12/2004 | Ji et al. |
| 2004/0260976 | A1 | 12/2004 | Ji et al. |
| 2005/0027748 | A1 | 2/2005 | Kisley |
| 2005/0071708 | A1 | 3/2005 | Bartlai et al. |
| 2005/0114285 | A1 | 5/2005 | Cincotta |
| 2005/0144202 | A1 | 6/2005 | Chen |
| 2005/0160427 | A1 | 7/2005 | Ustaris |
| 2005/0193245 | A1 | 9/2005 | Hayden et al. |
| 2005/0204106 | A1 | 9/2005 | Testardi |
| 2005/0289152 | A1 | 12/2005 | Earl et al. |
| 2006/0059204 | A1 | 3/2006 | Borthakur et al. |
| 2006/0218210 | A1 | 9/2006 | Sarma et al. |
| 2006/0259527 | A1 | 11/2006 | Devarakonda et al. |
| 2007/0011213 | A1 | 1/2007 | Burton et al. |
| 2007/0022129 | A1 | 1/2007 | Bahar et al. |
| 2007/0038689 | A1 | 2/2007 | Shinkai |
| 2007/0055702 | A1 | 3/2007 | Fridella et al. |
| 2007/0067584 | A1 | 3/2007 | Muto |
| 2007/0106712 | A1 | 5/2007 | Yamato et al. |
| 2007/0124271 | A1 | 5/2007 | Bauchot et al. |
| 2007/0156506 | A1 | 7/2007 | Hara |
| 2007/0185852 | A1 | 8/2007 | Erofeev |
| 2007/0198550 | A1 | 8/2007 | Irving et al. |
| 2007/0245112 | A1 | 10/2007 | Grubbs et al. |
| 2007/0288533 | A1 | 12/2007 | Srivastava et al. |
| 2007/0299955 | A1 | 12/2007 | Hoffman et al. |
| 2008/0010322 | A1 | 1/2008 | Lee et al. |
| 2008/0016300 | A1 | 1/2008 | Yim et al. |
| 2008/0109908 | A1 | 5/2008 | Havens et al. |
| 2008/0126833 | A1 | 5/2008 | Callaway et al. |
| 2008/0201366 | A1 | 8/2008 | Devarakonda et al. |
| 2008/0209145 | A1 | 8/2008 | Ranganathan et al. |
| 2008/0235300 | A1 | 9/2008 | Nemoto et al. |
| 2009/0119302 | A1 | 5/2009 | Palmer et al. |
| 2009/0150398 | A1 | 6/2009 | Raut |
| 2009/0193107 | A1 | 7/2009 | Srinivasan et al. |
| 2009/0235115 | A1 | 9/2009 | Butlin et al. |
| 2009/0254592 | A1 | 10/2009 | Marinov et al. |
| 2009/0276470 | A1 | 11/2009 | Vijayarajan et al. |
| 2009/0307245 | A1 | 12/2009 | Mullen et al. |
| 2010/0005072 | A1 | 1/2010 | Pitts |
| 2010/0107091 | A1 | 4/2010 | Amsterdam et al. |
| 2010/0185585 | A1 | 7/2010 | Schuchardt |
| 2010/0191884 | A1 | 7/2010 | Holenstein et al. |
| 2010/0332456 | A1 | 12/2010 | Prahlad et al. |
| 2011/0161294 | A1 | 6/2011 | Vengerov et al. |
| 2011/0246430 | A1 | 10/2011 | Prahlad et al. |
| 2011/0295804 | A1 | 12/2011 | Erofeev |
| 2011/0313971 | A1 | 12/2011 | Hironaga et al. |
| 2012/0117033 | A1 | 5/2012 | Vaidya |
| 2012/0136830 | A1 | 5/2012 | Patocka |
| 2012/0151245 | A1 | 6/2012 | Chang et al. |
| 2012/0151250 | A1 | 6/2012 | Saika |
| 2012/0166390 | A1 | 6/2012 | Merriman et al. |
| 2012/0185926 | A1 | 7/2012 | Topatan et al. |
| 2012/0209898 | A1 | 8/2012 | Leigh |
| 2012/0330894 | A1 | 12/2012 | Slik |
| 2013/0024722 | A1 | 1/2013 | Kotagiri et al. |
| 2013/0054524 | A1 | 2/2013 | Anglin et al. |
| 2013/0173530 | A1 | 7/2013 | Laron |
| 2013/0311421 | A1 | 11/2013 | Erdogan et al. |
| 2013/0325804 | A1 | 12/2013 | Bachar et al. |
| 2014/0019413 | A1 | 1/2014 | Braam et al. |
| 2014/0122428 | A1 | 5/2014 | Zhou et al. |
| 2014/0201177 | A1 | 7/2014 | Suryanarayan et al. |
| 2015/0248434 | A1 | 9/2015 | Avati et al. |
| 2015/0269213 | A1 | 9/2015 | Avati |
| 2015/0269214 | A1 | 9/2015 | Avati |

OTHER PUBLICATIONS

USPTO, Final Office Action for U.S. Appl. No. 14/218,250, dated Mar. 23, 2016.

(56) References Cited

OTHER PUBLICATIONS

USPTO, Office Action for U.S. Appl. No. 14/219,250, dated Jul. 1, 2016.
USPTO, Final Office Action for U.S. Appl. No. 14/219,250, dated Oct. 21, 2016.
USPTO, Office Action for U.S. Appl. No. 14/219,250, dated Feb. 13, 2017.
USPTO, Final Office Action for U.S. Appl. No. 14/219,250, dated Jun. 30, 2017.
USPTO, Office Action for U.S. Appl. No. 14/219,250, dated Sep. 5, 2017.
USPTO, Advisory Action for U.S. Appl. No. 14/219,250, dated Jun. 8, 2016.
USPTO, Advisory Action for U.S. Appl. No. 14/219,250, dated Jan. 6, 2017.
USPTO, Notice of Allowance for U.S. Appl. No. 14/219,250, dated Jan. 31, 2018.
USPTO, Final Office Action for U.S. Appl. No. 14/219,251, dated Nov. 23, 2016.
USPTO, Office Action for U.S. Appl. No. 14/219,251, dated Mar. 24, 2017.
USPTO, Advisory Action for U.S. Appl. No. 14/219,251, dated Jan. 30, 2017.
USPTO, Final Office Action for U.S. Appl. No. 14/219,251, dated Jul. 11, 2017.
USPTO, Advisory Action for U.S. Appl. No. 14/219,251, dated Sep. 12, 2017.
USPTO, Office Action for U.S. Appl. No. 14/219,251, dated Nov. 21, 2017.
USPTO, Final Office Action for U.S. Appl. No. 14/219,255, dated Jan. 12, 2017.
USPTO, Office Action for U.S. Appl. No. 14/219,255, dated May 17, 2017.
USPTO, Final Office Action for U.S. Appl. No. 14/219,255, dated Sep. 7, 2017.
USPTO, Office Action for U.S. Appl. No. 14/193,581, dated Apr. 20, 2016.
USPTO, Final Office Action for U.S. Appl. No. 14/193,581, dated Sep. 20, 2016.
USPTO, Office Action for U.S. Appl. No. 14/193,581, dated Jan. 9, 2017.
USPTO, Final Office Action for U.S. Appl. No. 14/193,581, dated Jul. 10, 2017.
USPTO, Final Office Action for Application No. 14/219,251, dated Apr. 8, 2016.
USPTO, Office Action for U.S. Appl. No. 14/219,251, dated Aug. 11, 2016.
USPTO, Advisory Action for U.S. Appl. No. 14/219,251, dated Jun. 10, 2016.
USPTO, Final Office Action for U.S. Appl. No. 14/219,255, dated Apr. 8, 2016.
USPTO, Office Action for U.S. Appl. No. 14/219,255, dated Aug. 25, 2016.
USPTO, Advisory Action for U.S. Appl. No. 14/219,255, dated Jun. 10, 2016.
"Change 175575fb7: Features/Changelog: Changelog Translator", Review.gluster.org, Updated Jul. 22, 2013, 6 p pages, http://review.gluster.org/#/c/5127/.
Avati, Anand, "Compacting Change Logs Using File Content Location Identifiers", U.S. Appl. No. 14/219,251, filed Mar. 19, 2014.
Avati, Anand, "Identifying Files in Change Logs Using File Content Location Identifiers", U.S. Appl. No. 14/219,255, filed Mar. 19, 2014.
Avati, Anand Vishweswaran and Karampuri, Pranith Kumar, "Delayed Asynchronous File Replication in a Distributed File System", U.S. Appl. No. 14/193,581, filed Feb. 28, 2014.
Birrell, Andrew D. et al., "The Echo Distributed File System", Sep. 10, 1993, 26 Pages http://www.hpl.hp.com/techreports/Compaq-DEC/SRC-RR-111.pdf.
Matheis, Johannes and Mussig, Michael, "Bounded Delay Replication in Distributed Databases with Eventual Consistency", Dec. 17, 2003, 100 Pages, http://www.diva-portal.org/smash/get/diva2:3243/FULLTEXT02.pdf.
USPTO, Office Action for U.S. Appl. No. 14/219,251 dated Dec. 23, 2015.
USPTO, Office Action for U.S. Appl. No. 14/219,255 dated Dec. 17, 2015.
Business Wire, "Gluster Announces Apache Hadoop Storage Compatibility in Latest GlusterFS Release", Published Aug. 23, 2011, Available at <http://fwww.businesswire.com/news/home/20110823005899/en/Giuster-Announces-Apache-Hadoop-Storage-Compatibility-Latest>, retreived Jan. 18, 2013.
Gluster Inc., "Gluster Filesystem Unified File and Object Storage—Beta 2", Published Aug. 2011, pp. 1-27, Available at <http://hypnotoad.uchicago.edu/roll-documentation/glusterfs/6.0/Gluster_Unified_File_and_Object_Storage_pdf>, retrieved Jan. 18, 2013.
Golub, Ben, "Why I believe in UFOS: Unified file and object storage," Computerworld Blogs, Jul. 28, 2011, 6 pages.
Raghavendra, G., "Change le8ddc0fb: Fuse: Auxiliary GFID Mount Support", Gluster.org, updated Jul. 19, 2013, 5 pages, http://review.gluster.org/#/c/4702/.
Avati, Anand and Suryanaraya, Amar Tumballi, "Identifying Files in Change Logs Using File Content Location Identifiers", U.S. Appl. No. 14/219,255, filed Mar. 19, 2014.
USPTO, Office Action for Application No. 14/193,581, dated Mar. 20, 2018.
USPTO, Final Office Action for U.S. Appl. No. 14/193,581, dated Oct. 11, 2018.
USPTO, Office Action for U.S. Appl. No. 14/193,581, dated May 14, 2019.
USPTO, Final Office Action for U.S. Appl. No. 14/193,581, dated Sep. 26, 2019.
USPTO, Office Action for U.S. Appl. No. 14/193,581, dated May 27, 2020.
USPTO, Advisory Action for U.S. Appl. No. 14/193,581, dated Jan. 17, 2019.
USPTO, Advisory Action for U.S. Appl. No. 14/193,581, dated Jan. 3, 2020.
USPTO, Final Office Action for U.S. Appl. No. 14/193,581, dated Oct. 14, 2020.
USPTO, Notice of Allowance for U.S. Appl. No. 14/193,581, dated Jan. 22, 2021.

* cited by examiner

FILE REPLICATION USING FILE CONTENT LOCATION IDENTIFIERS

RELATED APPLICATIONS

This application is a continuation of U.S. patent application Ser. No. 14/219,250 filed on Mar. 19, 2014, titled "File Replication Using File Content Location Identifiers," the entire content of which is incorporated by reference herein.

BACKGROUND

In modern operating systems, files may be referenced by file names. For example, in Unix family of operating systems, a file may be referenced by one or more names (e.g., hard links). Conversely, a "soft link" refers to a link to a file name, rather than to a file itself.

Files may be arranged in directories. A directory may contain a list of file names or links. The term "file" may also include directories, thus facilitating the existence of directory hierarchies, i.e., directories containing sub-directories. A file name may uniquely identify the file within the directory containing the file. The file name and the path to the directory containing the file may uniquely identify the file among all other files in the computer system.

BRIEF DESCRIPTION OF THE DRAWINGS

The present disclosure is illustrated by way of examples, and not by way of limitation, and may be more fully understood with references to the following detailed description when considered in connection with the figures, in which.

DETAILED DESCRIPTION

Figure 1:
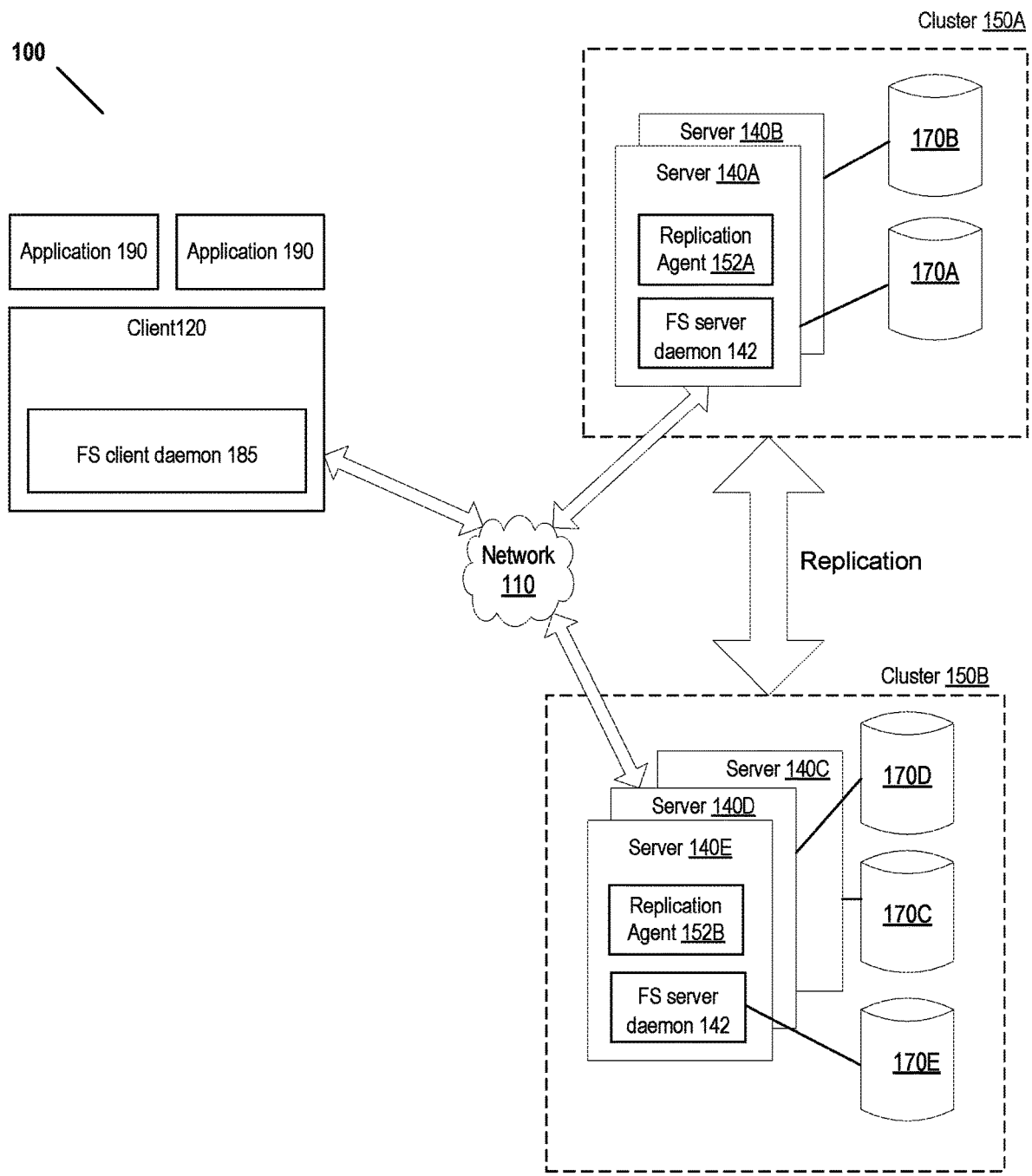
FIG. 1 schematically depicts component diagrams of example computer systems, in accordance with one or more aspects of the present disclosure.

Described herein are methods and systems for file replication using file content location identifiers in distributed file systems. In certain implementations, a distributed file system may be provided by a network attached storage (NAS) system comprising one or more file server computer systems each coupled to one or more persistent data storage devices, such as magnetic or optical storage disks, solid-state drives (SSDs), etc. "Computer system" or "computer" herein shall refer to a system comprising one or more processors, one or more memory devices, and one or more input/output (I/O) interfaces.

A file server may execute a network file system (NFS) server to manage file input/output (I/O) requests originated by NFS clients. One or more client computers can execute file system clients (e.g., NFS clients) to communicate with one or more file servers.

In certain implementations, a distributed file system may comprise two or more server clusters which may reside in geographically distributed locations. Data replication between geographically distributed clusters may be referred to as geo-replication. Volume-level replication may be performed from a cluster of the distributed file system that has been designated as a master to one or more clusters that have been designates as slaves. Volume-level replication may comprise various file system operations performed on a plurality of files comprised by a file system volume.

In certain implementations, volume-level replication may comprise a plurality of file system operations identifying each file or directory by its filename or directory name, respectively. However, if a file residing on the master file system has been renamed after being replicated to a slave file system, without modifying the file contents, the filename-based replication would, on the slave file system, result in deleting the existing file identified by the old name and copying the contents of the file from the master file system to the slave file system, in order to create a file with the new name on the slave. Since the replication agent identifies files by their file names, it has no means to determine that the copying operation is redundant, as the contents of the file were not changed.

Furthermore, identifying files and/or directories by their respective names may not always work correctly for files referenced by one or more hard links. "Hard link" herein refers to a directory entry that associates a name with a file. Certain file systems allow multiple hard links to be created for the same file, thus allowing multiple aliases for the file name, so that when the file is opened by referencing any of the hard links associated with the file, the changes that are made to the file contents will be visible when the file is opened by referencing any other hard links associated with the file. Deleting a file by referencing any of the hard links associated with the file, if there are two or more hard links referencing the same physical location on a storage device, would only delete the referenced hard link, but not the file contents or other hard links associated with the file. As a directory is a special type of a file, multiple hard links to directories are also possible, although this feature may not be enabled in certain operating systems.

In the process of file replication, if a file is referenced, on the master file system, by one or more hard links, then two or more copies of the file would be created on the slave file system by the replication agent, as the latter has no means to determine that the hard links identify the same physical location of the file on a storage device. Furthermore, if the contents of such a file are modified on the master file system by a process referencing the file by one of the hard links, then only the copy corresponding to that hard link would be modified on the slave file system by the replication agent, as the latter has no means to determine that the hard links identify the same physical location of the file on a storage device.

To address the above noted and other deficiencies, the present disclosure provides systems and methods for identifying files residing on the file system by unique identifiers associated with physical locations of the files on storage devices, rather than by the file names. The methods described herein may be employed by file replication and for certain other operations on distributed file systems (e.g., backup, self-healing, and storage media defect detection procedures).

Various aspects of the above referenced methods and systems are described in details herein below by way of examples, rather than by way of limitation.

FIG. 1 schematically depicts a high-level component diagram of an example distributed file system 1000 operating in accordance with one or more aspects of the present disclosure. Distributed file system 100 may include one or more storage clusters 150A-150B. Each storage cluster may comprise one or more file servers 140A-140E configured to individually and/or collectively store files and service file access requests (such as requests to create, access or modify a specified file). In the illustrative example of FIG. 1, each file server 140 may include one or more data storage devices 170A-170E. "Data storage device" herein shall refer to a memory device, such as a disk, RAID array, EEPROM device, or any other device capable of storing data.

One or more client computers 120 may be communicatively coupled, e.g., over a network 110, to file servers 140. A file server 140 may run a file system server daemon (or any other component such as a module or program) 142 to export a local file system to clients 120 as one or more volumes accessible by the clients.

Network 110 may be provided by one or more local area networks, one or more wide area networks, or any combination thereof. Client computer 120 may execute a file system client daemon 185 to connect to one or more servers 140 via an application-level protocol implemented over TCP/IP, InfiniB and or other transports, in order to access the file system volumes exported by one or more servers 140. Client computer 120 may further execute one or more applications 190.

In an illustrative example, cluster 150A may be designated as the master cluster, and cluster 150B may be designated as a slave cluster. In another illustrative example, there may be provided two or more slave clusters. In various examples, master cluster 150A and slave cluster 150B may have the same configuration of different configurations, with respect to servers, storage devices, and other cluster features. In certain implementations, master cluster 150A and one or more slave clusters 150B may reside in geographically distributed locations.

Replication agents 152A, 152B running on servers 140 may be configured to perform volume-level replication of master cluster 150A to one or more slave clusters 150B. In an illustrative example, replication agents 152A, 152B may constantly or periodically execute a background replication process to synchronize the file system volumes on master cluster 150A and one or more slave clusters 150B.

In certain implementations, the distributed file system may maintain a change log file reflecting the file system operations performed upon the file system objects (e.g., creation, modification, or deletion of files or directories) of the master cluster. Replication agent 152 may iterate through the change log records and perform, on one or more slave clusters 150B, the file operations specified by the change log record, as described in more details herein below.

In certain implementations, the replication agent may reference each file system object (a file or a directory) by an identifier of a data structure that comprises one or more identifiers of the physical locations of the contents of the file system object on a storage device, rather than identifying file system objects by their names, in order to avoid the above described redundant copying operations associated with file renaming and/or file aliasing by hard links. In an illustrative example, the replication agent may reference file system objects by identifiers of their index nodes.

"Index node" or "inode" herein shall refer to a data structure associated with a file system object (e.g., a file or a directory). An inode representing a file system object may comprise one or more identifiers of physical locations (e.g., disk blocks) that store the contents of the file system object. An inode may further comprise various attributes of the file system object, including manipulation metadata (e.g., file creation, access, and/or modification time), as well as owner and permission metadata (e.g., group identifier, user identifier, and/or permissions). An inode may be identified by its number.

In certain implementations, a plurality of inodes may be stored in an inode table residing in a known physical location on a storage device. The inode table may be indexed by the inode numbers, so that a file system driver may access the inode associated with a given file and retrieve the file physical location and/or file metadata. Alternatively, instead of implementing an inode table, certain file systems may store equivalent data in various other data structures.

In conventional file systems, when an inode is created, it may be assigned an arbitrary identifier (inode number), e.g., a random number. Hence, a file on the master cluster and a replica of the file on a slave cluster would have two different inode numbers, thus making it impractical for various clients (including, e.g., file replication agents) that need to access files on both master and slave clusters to reference the files by their inode numbers. The present disclosure resolves the issue of a file on the master cluster and its replica on a slave cluster being associated with two different inode numbers, by assigning the inode identifier associated with a particular file on the master cluster to the inode associated with a replica of the file on a slave cluster. Hence, both the file on the master cluster and the replica of the file on the slave cluster are associated with inodes having identical inode identifiers, thus enabling various clients (including, e.g., file replication agents) that need to access files on both master and slave clusters to reference the files by their inode numbers.

In certain implementations, for each file, the file system server may create a file name alias comprising an identifier of the respective inode, e.g., by creating a hard link with a name comprising the identifier of the inode referenced by the hard link. All such hard links may be placed in a pre-defined directory (e.g., a hidden directory) where they can be accessed by various clients (including, e.g., file replication agents), as schematically illustrated by FIG. 2.

Figure 2:
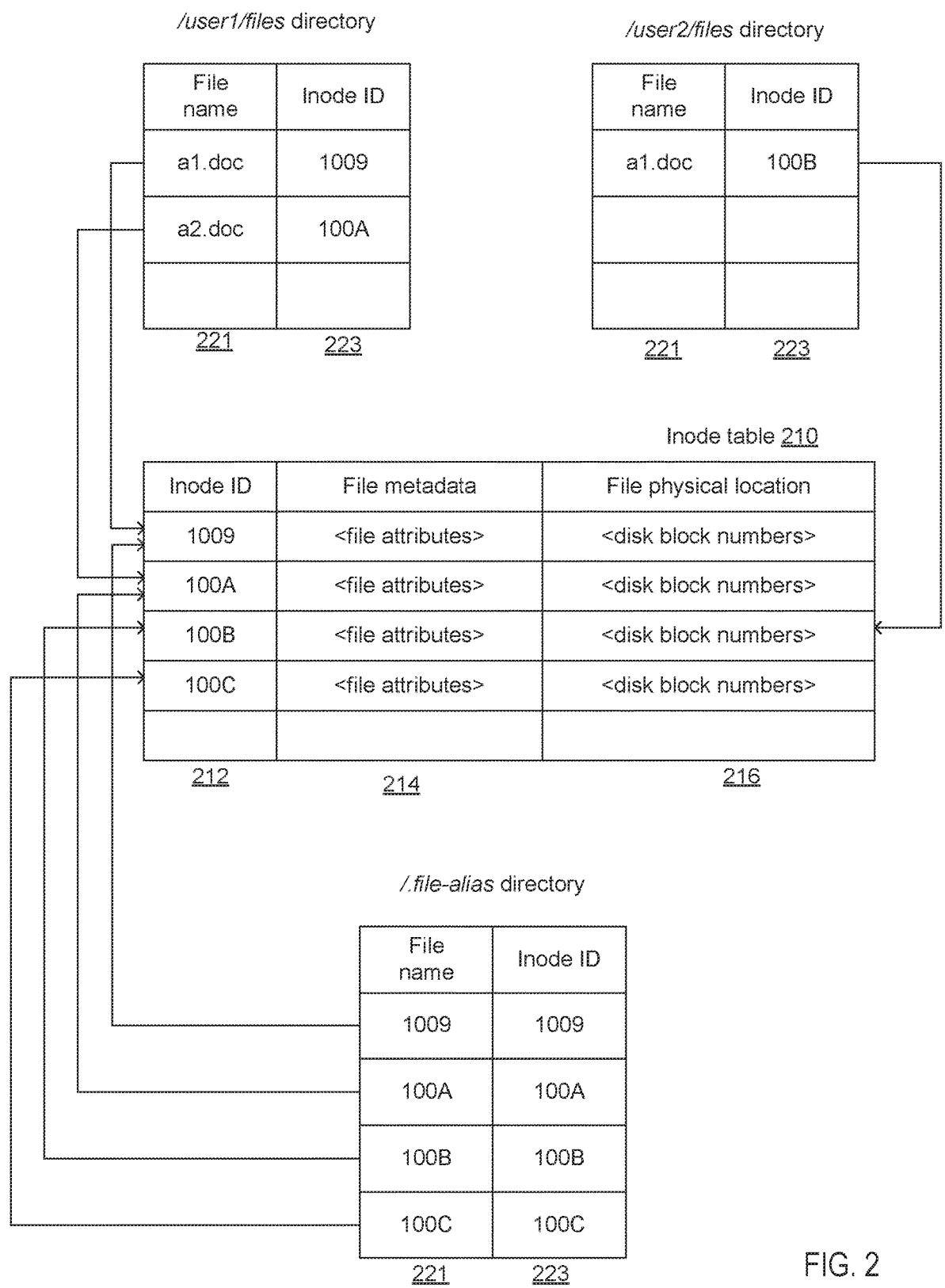
FIG. 2 schematically illustrates creating file aliases comprising file unique identifiers, in accordance with one or more aspects of the present disclosure.

In the illustrative example of FIG. 2, inode table 210 comprises a plurality of inode data structures graphically represented by the rows of table 210. Each inode data structure comprises an inode identifier 212, file attributes 214, and an identifier 216 of the physical location of the file contents. In various examples, inode identifier 212 may be provided by a unique number indexing inode table 210. File attributes 214 may comprise various attributes of the file system object, including manipulation metadata (e.g., file creation, access, and/or modification time), as well as owner and permission metadata (e.g., group identifier, user identifier, and/or permissions). Physical location identifier 216 may comprise identifiers of one or more disk blocks that store the contents of the file system object.

In the illustrative example of FIG. 2, directory named /user1/ files may comprise the files a1.doc and a2.doc, and directory named /user2/ files may comprise the file a1.doc. Each directory entry may comprise a file name 221 and an identifier of the inode 223 associated with the file. For each file of a plurality of files on the file system, a hard link having a name that comprises the identifier of the inode referenced by the hard link is placed into /.file-aliases directory. Thus, the file named /user1/files/a1.doc references the inode number 1009, and the same inode is referenced by the file named /file-aliases/1009; the file named /user1/files/a2.doc references the inode number 100A, and the same inode is referenced by the file named /.file-aliases/100A; and the file named /user2/files/a1.doc references the inode number 100B, and the same inode is referenced by the file named /.file-aliases/100B.

As noted herein above, the master file system may maintain a change log file reflecting the operations performed by file system clients upon the file system objects (e.g., creation, modification, or deletion of files). The change log may identify the file system objects by their respective inode identifiers. The change log may then be used by a volume-level replication agent, as well as by certain other procedures accessing the files (e.g., backup, self-healing, storage media defect detection procedures).

In an illustrative example, replication agent 152 may iterate through records of the change log file of master cluster 150A. For each change log record, replication agent 152 may construct a file name alias of the file referenced by its inode identifier. In an illustrative example, replication agent 152 may by append the inode identifier referenced by the change log record to a path to a pre-defined directory that stores file name aliases, where each file name alias comprises the identifier of the inode that stores the metadata for the file referenced by the file name alias, as described in more details herein above.

Upon constructing the file name alias for the file referenced by a change log record, replication agent 152 may perform, on one or more slave clusters 150B, the operations specified by the change log record. In an illustrative example, replication agent 152 may copy the file specified by the change log record from master cluster 150A to one or more slave clusters 150B. In various illustrative examples, replication agent 152 may delete, create, or rename, on one or more slave clusters 150B, the file specified by the change log record.

Figure 3:
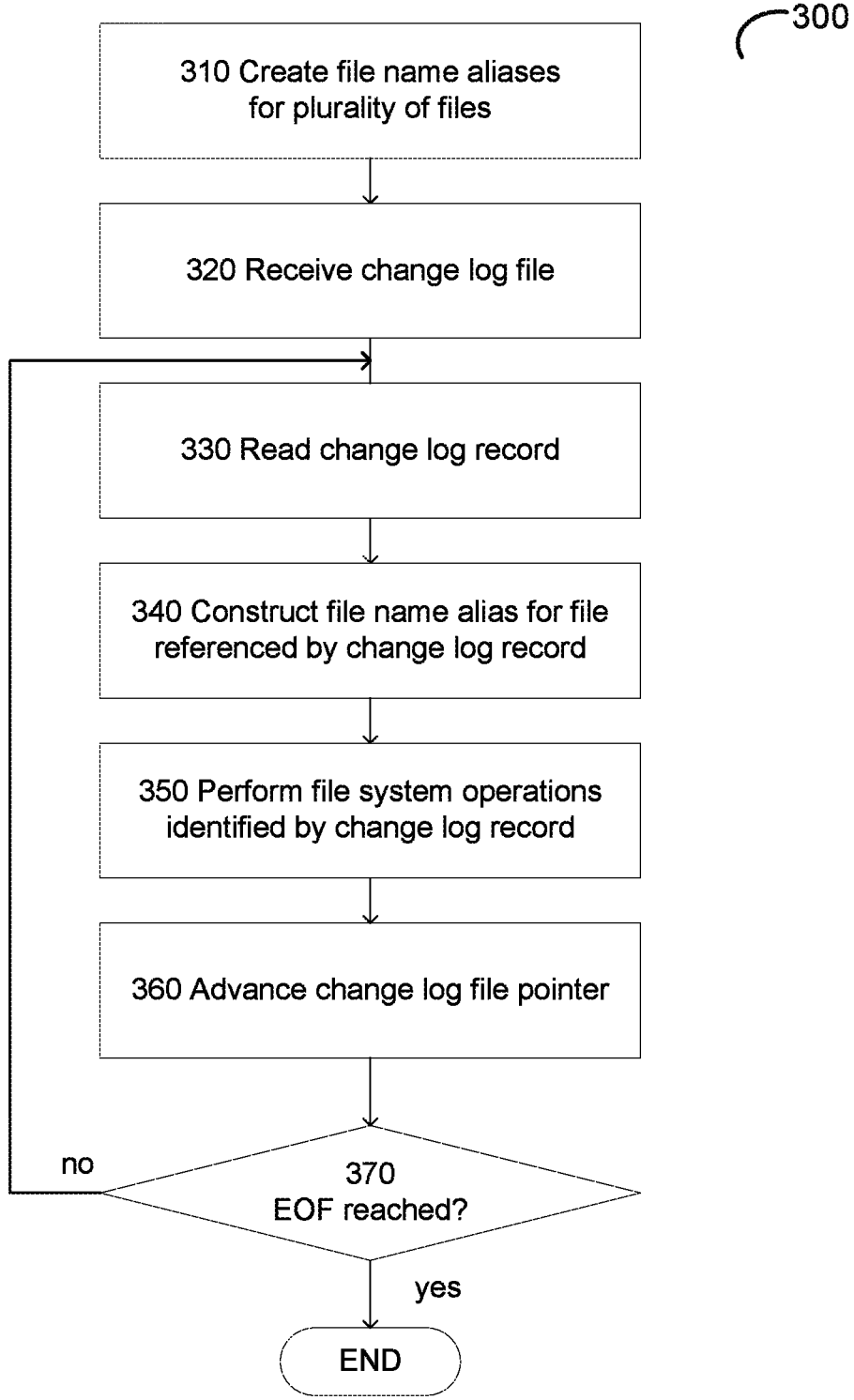
FIG. 3 depict a flow diagram of an example method for file replication using file content location identifiers, in accordance with one or more aspects of the present disclosure.

FIG. 3 depicts a flow diagram of an example method 300 performed by a distributed file system server for file replication using file content location identifiers. Method 300 and/or each of its individual functions, routines, subroutines, or operations may be performed by one or more processors of the computer system (e.g., file server 140 of FIG. 1) executing the method. In certain implementations, method 300 may be performed by a single processing thread. Alternatively, method 300 may be performed by two or more processing threads, each thread executing one or more individual functions, routines, subroutines, or operations of the method. In an illustrative example, the processing threads implementing method 300 may be synchronized (e.g., using semaphores, critical sections, and/or other thread synchronization mechanisms). Alternatively, the processing threads implementing method 300 may be executed asynchronously with respect to each other.

At block 310, a file system server may create file name aliases for a plurality of files of a file system, as described in more details herein above. In an illustrative example, for each file, a file name alias comprising an identifier of the respective inode may be created, e.g., by creating a hard link with a name comprising the identifier of the inode referenced by the hard link. All such hard links may be placed in a pre-defined directory (e.g., a hidden directory) where they can be accessed by various clients.

At block 320, a file replication agent running on the file system server may receive a change log file comprising a plurality of records.

At block 330, the replication agent may read a change log record identified by a file pointer associated with the change log file. The change log record may reflect one or more file system operations performed upon one or more file system objects (e.g., creation, modification, or deletion of files or directories). The change log record may identify the file system objects by their respective inode identifiers, as described in more details herein above.

At block 340, the replication agent may construct a file name alias of the file referenced by the change log record by its inode identifier. In an illustrative example, the replication agent may by append the inode identifier referenced by the change log record to a path to a pre-defined directory that stores file name aliases, where each file name alias comprises the identifier of the inode that stores the metadata for the file referenced by the file name alias, as described in more details herein above.

At block 350, the replication agent may perform the file system operations specified by the change log record. In performing the file system operations, the replication agent may reference the file by the file name alias, as described in more details herein above. In an illustrative example, the file system operations to be performed may comprise copying the file from a master file server to a slave file server. In another illustrative example, the file system operation to be performed may comprise deleting a replica of the file on the slave file server. In another illustrative example, the file system operation to be performed may comprise renaming the replica of the file on the slave file server.

At block 360, the replication agent may advance the pointer associated with the log file to point to the next log file record.

Responsive to determining, at block 370, that the end of log file has been reached, the method may terminate; otherwise, the method may loop back to block 330 to process the next change log record.

Figure 4:
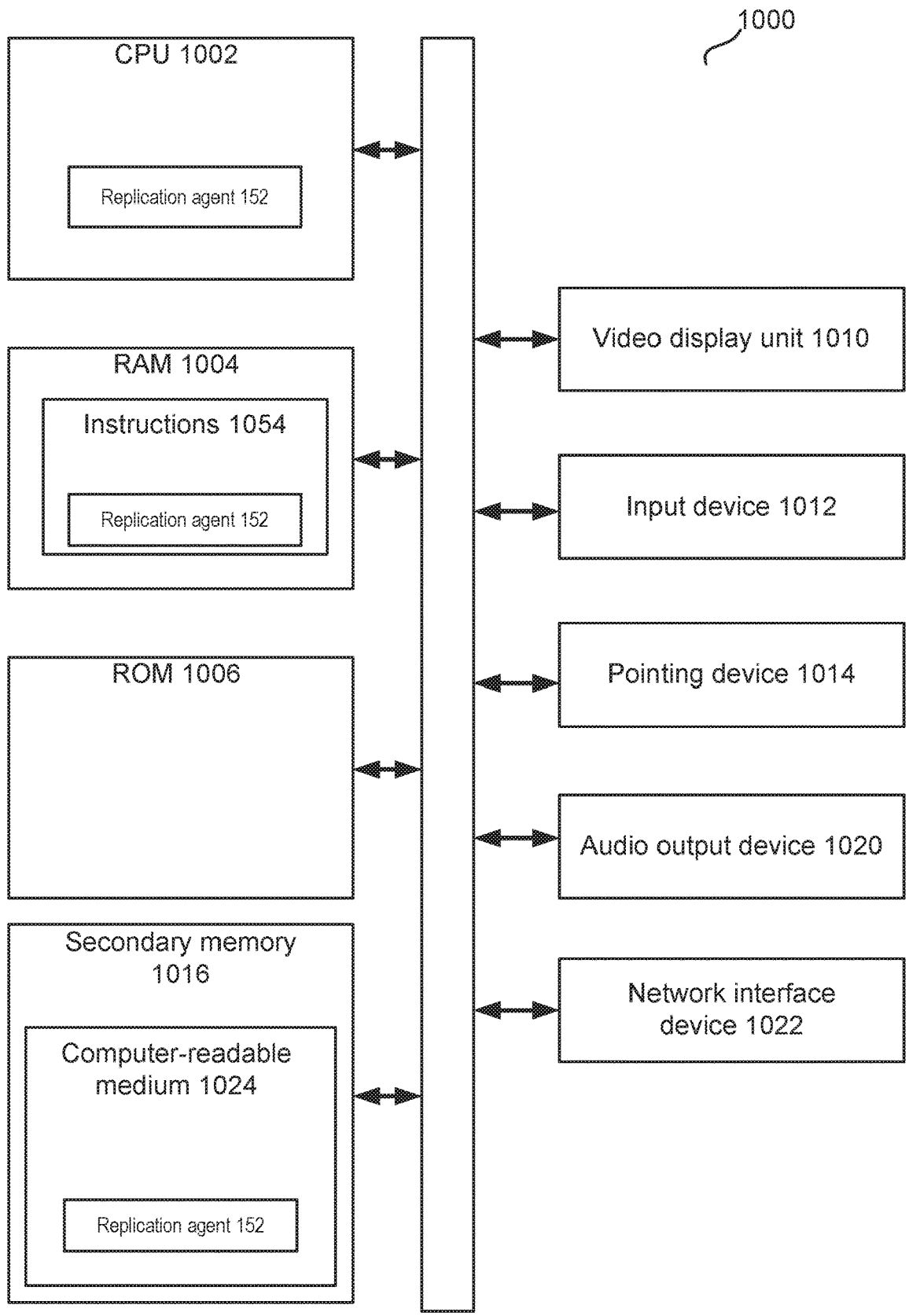
FIG. 4 depicts an illustrative computer system operating in accordance with one or more aspects of the present disclosure.

FIG. 4 depicts an illustrative computer system operating in accordance with examples of the present disclosure. In illustrative examples, computer system 1000 may correspond to file system server 140 of FIG. 1.

In one example, computer system 1000 may be connected (e.g., via a network, such as a Local Area Network (LAN), an intranet, an extranet, or the Internet) to other computer systems (e.g., other nodes). Computer system 1000 may operate in the capacity of a server or a client computer in a client-server environment, or as a peer computer in a peer-to-peer or distributed network environment. Computer system 1000 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, computer system 1000 may include a processor 1002, a volatile memory 1004 (e.g., random access memory (RAM)), a non-volatile memory 1006 (e.g., read-only memory (ROM) or electrically-erasable programmable ROM (EEPROM)), and a storage memory 1016 (e.g., a data storage device), which may communicate with each other via a bus 1008.

Processor 1002 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 1000 may further include a network interface device 1022. Computer system 1000 also may include a video display unit 1010 (e.g., an LCD), an alphanumeric input device 1012 (e.g., a keyboard), a pointing device 1014 (e.g., a mouse), and an audio output device 1020 (e.g., a speaker).

In an illustrative example, secondary memory 1016 may include a tangible computer-readable storage medium 1024 on which may be stored instructions 1054 encoding file system server daemon 142 implementing method 300 for file replication using file content location identifiers. In an illustrative example, secondary memory 1016 may include a tangible computer-readable storage medium 1024 on which may be stored instructions 1054 encoding replication agent 152 implementing method 300 for file replication using file content location identifiers. Instructions 1054 may also reside, completely or partially, within main memory 1004 and/or within processor 1002 during execution thereof by computer system 1000, hence, main memory 1004 and processor 1002 may also constitute machine-readable storage media.

While computer-readable storage medium 1024 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and software components, or only in software.

Unless specifically stated otherwise, terms such as "updating", "identifying", "determining", "sending", "assigning", or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices.

Examples described herein also relate to an apparatus for performing the methods described herein. This apparatus may be specially constructed for performing the methods described herein, or it may comprise a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform method 300 and/or each of its individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method, comprising:
   receiving, by a processing device, an index node number identifying a first index node associated with a file residing on a first file server, the first index node referencing a physical location of contents of the file;
   identifying a replica of the file residing on a second file server;
   assigning the index node number of the first index node to a second index node referencing a physical location of contents of the replica of the file on the second file server, thus causing the file residing on the first file server and the replica residing on the second file server to be associated with respective index nodes having a common index node number;
   performing, by the processing device, a file system operation by accessing the replica of the file referenced by the index node number.

2. The method of claim 1, wherein performing the file system operation further comprises:
   accessing the replica of the file using a file name alias constructed by appending the index node number of the first index node to an identifier of a defined directory.

3. The method of claim 1, wherein performing the file system operation further comprises at least one of:
   creating the replica of the file on the second file server, copying the contents of the file from the first file server to the second file server, deleting the replica of the file on the second file server, or renaming the replica of the file on the second file server.

4. The method of claim 1, wherein the file name alias is provided by a hard link.

5. The method of claim 1, wherein identifying the replica of the file residing on the second file server further comprises:
   creating the replica of the file on the second file server; and
   assigning a randomly generated identifier to the second index node referencing the physical location of contents of the replica of the file on the second file server.

6. The method of claim 1, wherein receiving the index node number comprises reading a log record comprising the index node number of the first index node.

7. The method of claim 1, wherein the first file server belongs to a first storage cluster and the second file server belongs to a second storage cluster.

8. A system, comprising:
   a memory; and a processing device, operatively coupled to the memory, to:

receive an index node number identifying a first index node associated with a file residing on a first file server, the first index node referencing a physical location of contents of the file;

identify a replica of the file residing on a second file server;

assign the index node number of the first index node to a second index node referencing a physical location of contents of the replica of the file on the second file server, thus causing the file residing on the first file server and the replica residing on the second file server to be associated with respective index nodes having a common index node number;

perform a file system operation by accessing the replica of the file referenced by the index node number.

9. The system of claim 8, wherein performing the file system operation further comprises:

accessing the replica of the file using a file name alias constructed by appending the index node number of the first index node to an identifier of a defined directory.

10. The system of claim 8, wherein performing the file system operation further comprises at least one of:

creating the replica of the file on the second file server, copying the contents of the file from the first file server to the second file server, deleting the replica of the file on the second file server, or renaming the replica of the file on the second file server.

11. The system of claim 8, wherein the file name alias is provided by a hard link.

12. The system of claim 8, wherein identifying the replica of the file residing on the second file server further comprises:

creating the replica of the file on the second file server; and assigning a randomly generated identifier to the second index node referencing the physical location of contents of the replica of the file on the second file server.

13. The system of claim 8, wherein receiving the index node number comprises reading a log record comprising the index node number of the first index node.

14. The system of claim 8, wherein the first file server belongs to a first storage cluster and the second file server belongs to a second storage cluster.

15. A non-transitory computer-readable storage medium comprising executable instructions that, when executed by a processing device, cause the processing device to:

receive an index node number identifying a first index node associated with a file residing on a first file server, the first index node referencing a physical location of contents of the file;

identify a replica of the file residing on a second file server;

assign the index node number of the first index node to a second index node referencing a physical location of contents of the replica of the file on the second file server, thus causing the file residing on the first file server and the replica residing on the second file server to be associated with respective index nodes having a common index node number;

perform a file system operation by accessing the replica of the file referenced by the index node number.

16. The non-transitory computer-readable storage medium of claim 15, wherein performing the file system operation further comprises at least one of:

creating the replica of the file on the second file server, copying the contents of the file from the first file server to the second file server, deleting the replica of the file on the second file server, or renaming the replica of the file on the second file server.

17. The non-transitory computer-readable storage medium of claim 15, wherein the file name alias is provided by a hard link.

18. The non-transitory computer-readable storage medium of claim 15, wherein identifying the replica of the file residing on the second file server further comprises:

creating the replica of the file on the second file server; and assigning a randomly generated identifier to the second index node referencing the physical location of contents of the replica of the file on the second file server.

19. The non-transitory computer-readable storage medium of claim 15, wherein receiving the index node number comprises reading a log record comprising the index node number of the first index node.

20. The non-transitory computer-readable storage medium of claim 15, wherein the first file server belongs to a first storage cluster and the second file server belongs to a second storage cluster.

\* \* \* \* \*